Patented July 8, 1941

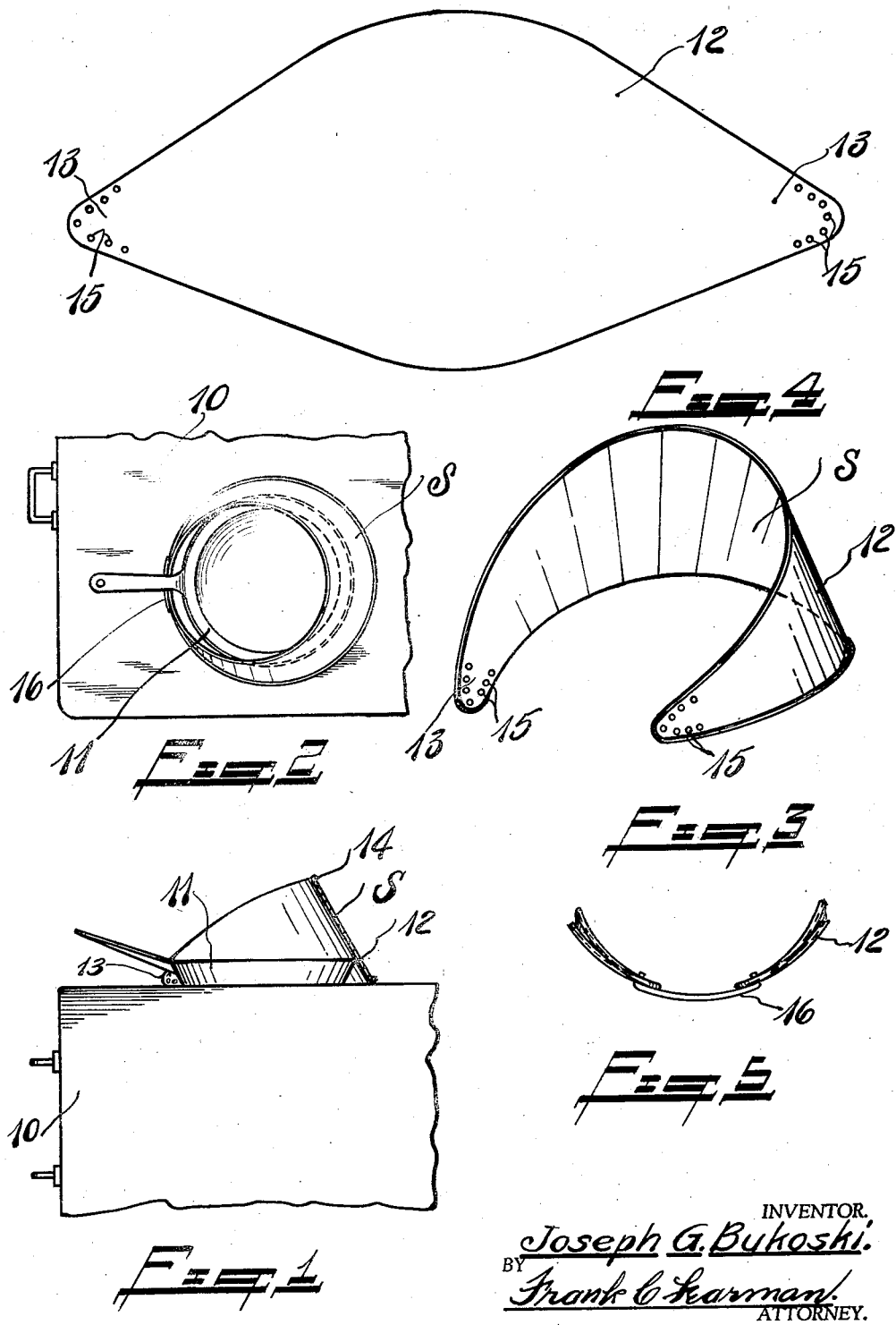

2,248,216

UNITED STATES PATENT OFFICE 2,248,216

SPLASH GUARD

Joseph G. Bukoski, Ubly, Mich.

Application October 28, 1940, Serial No. 363,083

3 Claims. (Cl. 53—7)

This invention relates to splash guards for use in connection with frying pans and similar utensils when used for frying fish, meat, and other edibles.

One of the prime objects of the invention is to design a splash guard to provide an effective medium to avoid fat splattering from the frying pan over the surface of the stove and over other utensils adjacent thereto during a frying operation.

Another object is to design a splash guard which can be quickly and easily placed in position, and which is economical to manufacture and distribute.

A further object is to provide a splash guard provided with means for adjusting the diameter thereof to suit frying pans or utensils of various sizes, and which has no sharp corners or recesses in which fat or foreign matter can lodge, thus making it extremely easy to clean and polish.

A still further object is to design a splash guard, which permits free access to the contents of the pan so that the cook can easily insert, turn, and remove articles of food, and which arrests the fat which splatters from the pan during the frying operation, thus avoiding soiling of the stove and the disagreeable odor resulting from the falling of particles of fat on the stove.

The invention consists in the details of construction and in the general design whereby certain important advantages are obtained and the device retained, simpler, less expensive to construct, and otherwise more convenient and advantageous for use as will be herein more fully set forth. The novel features of my invention will hereinafter be definitely claimed.

In the drawing:

Fig. 1 is a fragmentary, side elevational view showing a stove with a frying pan thereon and my improved splash guard, shown in section, positioned around the pan;

Fig. 2 is a top plan view thereof;

Fig. 3 is an enlarged, isometric view of the splash guard;

Fig. 4 is an enlarged detail showing the splash guard sheet; and,

Fig. 5 is a fragmentary detail view illustrating the attaching means.

Referring now more particularly to the drawing in which I have shown a portion of a stove indicated by the numeral 10, and showing a frying pan 11 positioned thereon, the splash guard S being shown surrounding the pan to prevent fat from splattering over the surface of the stove as the pan contents are being fried.

The splash guard is formed as clearly shown in Figs. 1, 2, and 3 of the drawing, and is made up of a flat sheet of material 12, the center portion of the top and bottom edges being curved as shown with the end sections of the sheet terminating in relatively narrow portions 13 so that when the guard is bent to position, it closely resembles a visor in shape, the high portion of the guard projecting inwardly at an angle over the frying pan, thus serving as a partial hood to prevent fat splattering up over the top of the guard.

A wire 14 can be rolled in the top and bottom edges of the sheet 12 to stiffen and reinforce the structure, or, if desired, the edges may be rolled to form a conventional bead (not shown).

Spaced apart openings 15 are provided in the lower edge of the guard directly adjacent the ends thereof, and when said guard is placed in position, the ends of the sheet are secured together by means of a tie bar 16, the ends 18 of said tie bar being bent at right angles to the main body of the bar, and are of a size to permit insertion in the pre-selected openings, so that the diameter of the guard may be adjusted to suit the size of the frying pan to which it is applied.

This tie bar can be formed of any material desired, but I find that ordinary heavy gauge wire forms a very satisfactory tie. Both the guard and tie bar are very simple, easy, and economical to manufacture, and the sheet material can be very light in weight, thus requiring a minimum of labor to cut and form, after which the guards can be packed flat, or the ends can be secured together and the guards nested in the usual manner.

I wish to direct attention to the fact that the guard is reversible as to top and bottom, the angle of the sheet when reversed being different than the angle shown in Fig. 1, and additional openings 15 are therefore provided in the opposite edges of the sheet to permit adjustment when the guard is reversed.

It will also be obvious that my invention is susceptible to various changes and modifications without departing from the spirit and principles thereof, and I therefore do not wish to be understood to limit myself to the precise arrangement and formation of the several parts herein shown in carrying out my invention in practice, except as hereinafter claimed.

What is claimed is:

1. A splash guard for frying pans, comprising a flat sheet formed with reduced end sections, spaced openings in said end sections, and a tie bar detachably engageable in said openings when the sheet is bent to circular shape for holding it in bent position.

2. A splash guard for cooking utensils comprising a flat sheet having reinforced edges and reduced end sections, spaced openings in the edges of the end sections, and a tie bar detachably engageable in said openings for holding the sheet in adjusted position after it has been bent to shape.

3. A splash guard of the character described and comprising a flat sheet, the edges of which are curved and reinforced, the end sections being tapered so that when the sheet is bent to circular shape, the upper edge will project inwardly over the lower edge, and a tie bar releasably connecting the ends of the sheet.

JOSEPH G. BUKOSKI.